May 5, 1964  D. F. MUSTO  3,131,957
APPARATUS FOR TYING LEADERS AND LINES
Filed June 18, 1962
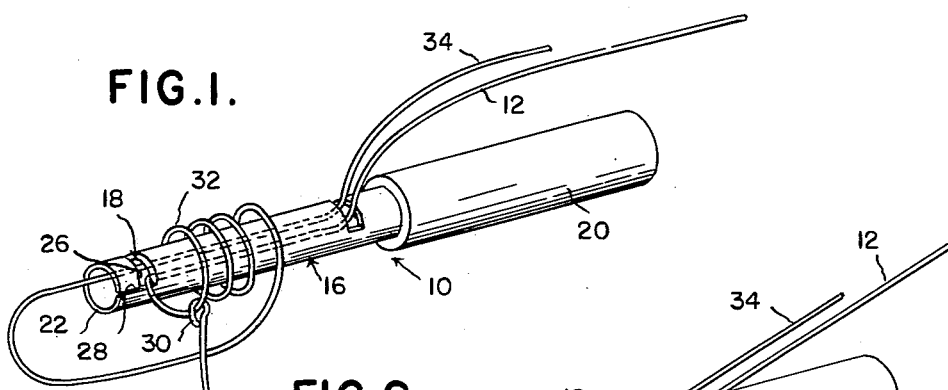
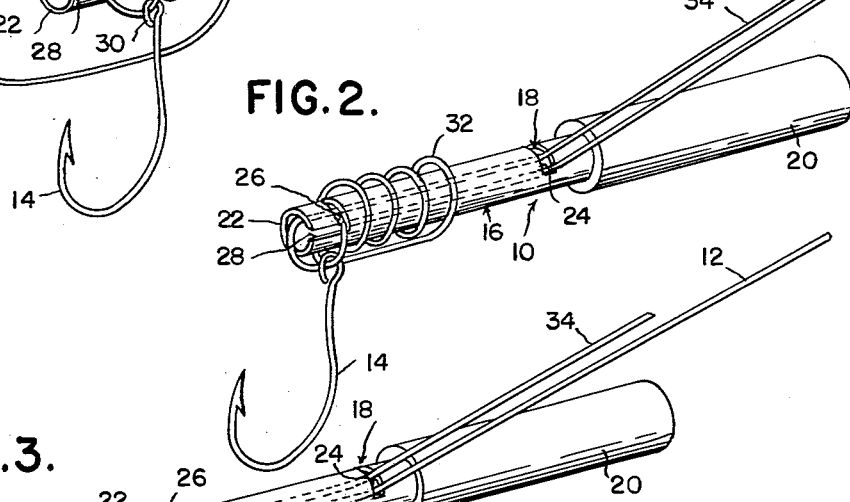
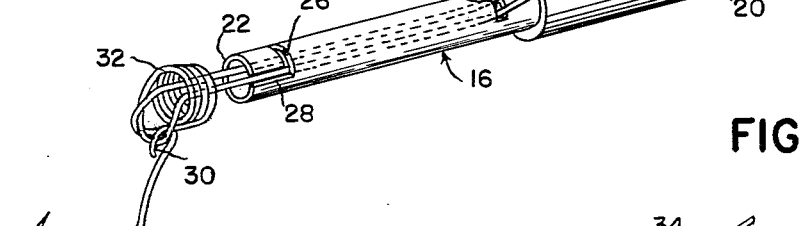
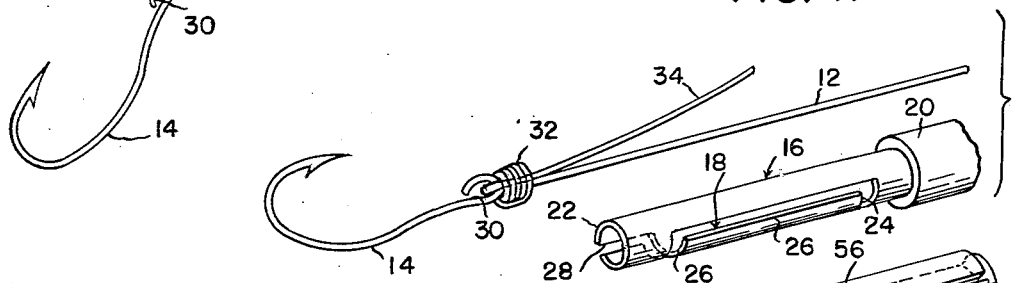
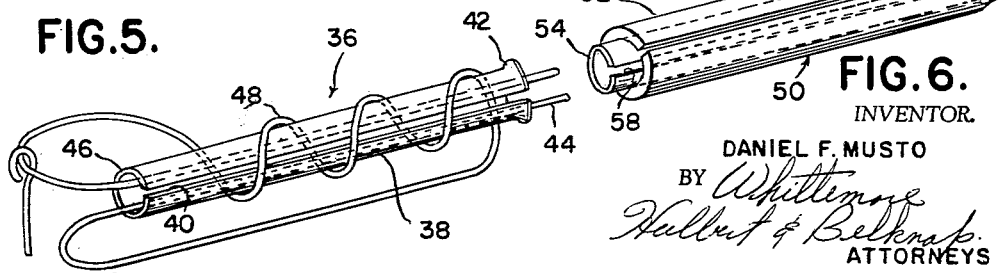
INVENTOR.
DANIEL F. MUSTO
BY *Whittemore*
*Hulbert & Belknap*
ATTORNEYS United States Patent Office 3,131,957
Patented May 5, 1964

3,131,957
APPARATUS FOR TYING LEADERS AND LINES
Daniel F. Musto, 7835 Archdale, Detroit 28, Mich.
Filed June 18, 1962, Ser. No. 203,255
5 Claims. (Cl. 289—17)

The invention relates to knot tying and refers more specifically to a tool for and method of tying knots in fish lines or leaders to secure hooks, swivels, artificial bait and the like thereto.

The securing of hooks, swivels, artificial bait and the like to fish lines and leaders is usually accomplished under relatively difficult conditions since the fingers of the person tying the lines or leaders may be stiff or cold and the swivels, hooks and the like are relatively small and sometimes sharp. In addition many fish lines and leaders do not lend themselves to ready deformation into the desired knot forms and the tying of the lines and leaders is often accomplished on an unstable platform such as a boat.

Thus in the past securing of members such as hooks, swivels and the like to fish lines has been a relatively tedious, sometimes dangerous, usually slow and unpredictable necessity.

It is therefore one of the objects of the present invention to provide a tool for use in tying knots.

Another object is to provide an improved method of tying a knot in a line for securing a member thereto.

Another object is to provide a tool for use in tying a knot in a fish line or the like to secure a hook or the like thereto comprising an elongated tubular member having a longitudinal slit therein extending the entire length thereof.

Another object is to provide a tool for use in tying knots in fish lines or leaders for securing fishing equipment, such as hooks and swivels, thereto comprising an elongated tubular member having a longitudinal slit therein extending the entire length thereof and a sleeve surrounding the tubular member having a longitudinal slit therein extending the entire length thereof adapted to be aligned with the slit in the tubular member on relative rotation of the tubular member and sleeve.

Another object is to provide a tool for use in tying knots in fish lines, leaders or the like for securing hooks, swivels, artificial bait or the like to the line or leader comprising an elongated tubular member having a slit in one end thereof extending in sequence longitudinally of the tubular member, circumferentially thereof, longitudinally again and then circumferentially of the tubular member in longitudinal alignment with the first circumferentially extending portion of the slit and a handle secured to the other end of the tubular member.

Another object is to provide a method of tying a knot in a line to secure a member, such as a fish hook or swivel thereto, comprising threading the line through a tubular member, passing the line through the member to be secured thereto, wrapping the line about the tubular member in a plurality of convolutions, threading the line back through the tubular member, slipping the convolutions of the line from the tubular member while tensioning the line and removing the tubular member from the line.

Another object is to provide a tool for and method of tying a knot in a line for securing a member thereto which are simple, economical and efficient.

Other objects and features of the invention will become apparent as the description proceeds, especially when taken in conjunction with the accompanying drawings, illustrating preferred embodiments of the invention, wherein:

FIGURES 1–3 are perspective views of a tool for use in tying a knot in a line to secure a member thereto illustrating three successive steps in the method of tying the knot.

FIGURE 4 is a perspective view of one end of the tool shown in FIGURES 1–3 rotated approximately one hundred eighty degrees with respect to the longitudinal axis of the tool showing a line with a knot tied therein removed therefrom.

FIGURE 5 is a perspective view of a modification of the tool illustrated in FIGURES 1–4.

FIGURE 6 is a perspective view of a modification of the tool illustrated in FIGURE 5.

With particular reference to the figures one embodiment of the present invention will now be considered in detail.

As shown best in FIGURES 1–4 the tool 10 is illustrated in use in tying a knot in line 12 to secure a fish hook 14 thereto. The tool 10 includes the elongated tubular member 16 having the slit 18 in one end thereof and the handle 20 secured to the other end thereof.

The method of use of the tool 10 includes threading the line 12 through the circumferentially extending portions of slit 18 in the tubular member 16, passing the line 12 through the hook 14, wrapping the line about the tubular member in a plurality of convolutions, passing the line back through the tubular member and out of the slit therein and subsequently removing the convolutions from the tubular member while tensioning the line 12 and removing the line 12 from the slit 18 as will be considered in more detail subsequently.

More specifically the elongated tubular member 16 may be constructed of metal, such as aluminum or steel or may be produced in plastic if desired. When used in conjunction with the leaders or fishing lines 12 the tubular member may be a quarter inch in diameter and approximately two and one-half inches long between the end 22 thereof and the handle 20.

The slit provided in the end 22 of the tubular member 16 is provided with a first circumferentially extending portion 24, a longitudinally extending portion 26, shown best in FIGURE 4, a second circumferentially extending portion 26 substantially axially aligned with the circumferentially extending portion 24 and an axially extending portion 28 extending through the end 22 of the tubular member. The slit 18 is formed as shown to permit removal of the tool 10 from the line 12 after a knot has been formed in the line while preventing undesired withdrawal of the line 12 from the slit 18 during tying of a knot in the line.

The handle 20, as shown, may be of any convenient form to permit ready handling of the tool 10 and may be of a material similar to the tubular member 16 or may be of contrasting material. In fact, the handle 20 may be produced integrally with the tubular member 16 and both may be colored as desired in either similar or contrasting colors.

Separate steps in the method of tying a knot in the line 12 in accordance with the invention are illustrated in FIGURES 1–4. Thus in FIGURE 1 the line 12 has been passed through the circumferentially extending portion 24 of the slit 18 of the tool 10 and extends longitudinally of the tubular member 16 and out of the circumferentially extending portion 26 thereof. The line 12 is then passed through the eyelet 30 formed in the hook 14 and is then passed around the tubular member 16 in a plurality of convolutions 32 after which the end 34 of the line 12 is passed into the end 22 of the tubular member 16 and extends longitudinally thereof and out of the circumferentially extending portion 24 of the slit 18.

Subsequently the convolutions of the line 12 wrapped around the tubular member 16 are slipped from the end 22 of the tubular member 16 while tension is applied to the line 12 which step is illustrated in FIGURES 2 and 3. In FIGURE 3 the convolutions 32 have been entirely removed from the tubular member 16 and it remains only to tighten the knot formed in the line adjacent the eyelet 30 of the hook to firmly secure the hook to the line 12.

As shown in FIGURE 4 the knot formed in the line 12 by the above described method has been tightened by tensioning the line 12 and hook 14 while gradually slipping the convolutions 32 of the line 12 toward the eyelet 30 of the hook 14. Also, as shown in FIGURE 4, the line 12 has been removed from the tool 10 through the slit 18 by rotating the tool 10 with respect to the line 12 and moving the line 12 radially with respect to the tool.

Thus it is seen that in accordance with the invention there is provided a simple, economical and efficient tool for and method of tying knots in a line, such as a fish line or leader, for securing members thereto, such as hooks, swivels and artificial bait. Further, it will be evident that the tool 10 and the method disclosed may be used under adverse conditions by relative amateurs in the tying of knots in lines or leaders with uniform results.

The modification 36 of the tool for tying knots in lines or leaders or the like illustrated in FIGURE 5 comprises an elongated tubular member 38 having a slit 40 therein extending longitudinally for the entire length thereof. One or both ends of the tubular member 38 may be flared radially outward as illustrated at end 42 in FIGURE 5. With some constructions the flared ends 42 may be useful in preventing wear on the line 44 during tying of a knot therein. A flare on end 46 of the tubular member 38 is somewhat objectionable in that it may hinder the removal of the convolutions 48 of the line 44 from the tubular member 38. The method of use of the tool 36 is substantially the same as that for the tool 10 and will therefore not be considered in detail.

The modified tool 50 illustrated in FIGURE 6 is substantially the same as the tool 36 but further includes the exterior sleeve 52 surrounding the tubular member 54. Sleeve 52 includes the longitudinal slit 56 extending the entire length thereof.

In use the sleeve 52 is first rotated relative to the tubular member 54 so that the slits 56 and 58 are radially misaligned whereby a line threaded through the tubular member 54 is not permitted to be withdrawn through the slit 58. After the knot has been tied in the line the sleeve 52 and tubular member 54 are rotated relative to each other to align the slits 56 and 58 so that the line may be withdrawn through the aligned slits. Thus the added function of the sleeve 52 is to prevent accidental withdrawing of the line in which the knot is being tied from the slit 58 in the tubular member 54.

While one embodiment of the present invention and modifications thereof have been considered in detail, it will be understood that other embodiments and modifications are contemplated. It is the intention to include all modifications and embodiments of the invention defined by the appended claims within the scope of the invention.

What I claim as my invention is:

1. Structure for securing a leader to a fish hook which fish hook has an eyelet in the shank thereof comprising an elongated tubular member having a bore of substantially uniform cross section which is free of obstacles throughout the entire length thereof, said tubular member also having a slot extending from one end thereof toward the other end thereof terminating in a portion extending circumferentially thereof adjacent said other end thereof, and a cylindrical handle secured to said tubular member at said other end thereof and in axial alignment therewith.

2. Structure as set forth in claim 1 wherein the slot in said tubular member also has a portion adjacent said one end thereof extending circumferentially of said tubular member.

3. Structure as set forth in claim 2 wherein each of the circumferentially extending portions of the slot extend substantially perpendicularly to the portion of the slot therebetween.

4. Structure as set forth in claim 3 wherein each of the circumferentially extending portions of the slot in the tubular member extends in the same direction from the portion of the slot extending therebetween.

5. Structure for securing a leader to a fish hook which fish hook has an eyelet in the shank thereof comprising an elongated tubular member having a bore of substantially uniform cross section which is free of obstacles throughout the entire length thereof, said tubular member also having a slot extending from one end thereof toward the other end thereof terminating in a portion extending circumferentially thereof adjacent said other end thereof.

References Cited in the file of this patent

UNITED STATES PATENTS

| | | |
|---|---|---|
| 2,697,624 | Thomas et al. | Dec. 21, 1954 |
| 2,726,468 | Fahy | Dec. 13, 1955 |
| 2,747,246 | Oldham | May 29, 1956 |
| 2,926,036 | Wimberley | Feb. 23, 1960 |
| 2,992,029 | Russell | July 11, 1961 |